United States Patent
Combs et al.

(10) Patent No.: US 11,881,568 B2
(45) Date of Patent: **\*Jan. 23, 2024**

(54) SYSTEM AND METHOD FOR MAINTAINING A FLEET OF AIRCRAFT BATTERIES LOCATED AT MULTIPLE AIRPORTS

(71) Applicant: Ampaire, Inc., Temecula, CA (US)

(72) Inventors: Cory Michael Combs, Murrieta, CA (US); Kevin Noertker, Alhambra, CA (US)

(73) Assignee: Ampaire, Inc., Temecula, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/527,055

(22) Filed: Nov. 15, 2021

(65) Prior Publication Data
US 2022/0077516 A1   Mar. 10, 2022

Related U.S. Application Data (63) Continuation of application No. 16/399,929, filed on Apr. 30, 2019, now Pat. No. 11,177,515.

(51) Int. Cl.
*H01M 10/48* (2006.01)
*B64D 27/24* (2006.01)
(Continued)

(52) U.S. Cl.
CPC .......... *H01M 10/482* (2013.01); *B60L 58/14* (2019.02); *B60L 58/15* (2019.02); *B60L 58/16* (2019.02);
(Continued)

(58) Field of Classification Search
CPC .......... H01M 10/482; H01M 2220/20; B64D 27/24; B60L 58/15; B60L 58/16;
(Continued)

(56) References Cited

U.S. PATENT DOCUMENTS

| | | | | |
|---|---|---|---|---|
| 7,948,207 B2 * | 5/2011 | Scheucher | ............... | H02J 3/322 324/427 |
| 8,963,481 B2 * | 2/2015 | Prosser | .................... | B60L 53/00 320/105 |

(Continued)

FOREIGN PATENT DOCUMENTS

| | | | | |
|---|---|---|---|---|
| DE | 112019004579 T5 * | 7/2021 | ............. | B60L 58/16 |
| WO | WO-2020142738 A1 * | 7/2020 | ............. | B60L 53/30 |

*Primary Examiner* — M Baye Diao (57) ABSTRACT

A system for maintaining a fleet of aircraft batteries located at multiple airports. The system may be configured to obtain charge information and battery health information for individual batteries within the fleet of aircraft batteries from charging containers located at individuals ones of the multiple airports. The charge information may include charge statuses of the individual batteries and/or the battery health information may characterize the degradation of the individual batteries over time. The system may determine predictions of one or more batteries to be re-allocated and/or to receive maintenance based on the battery health information. The system may generate a battery management plan including the one or more predictions recommending one or more batteries to be re-allocated and/or to receive maintenance.

18 Claims, 8 Drawing Sheets

(51) Int. Cl.
*B60L 58/15* (2019.01)
*B60L 58/16* (2019.01)
*B60L 58/18* (2019.01)
*B60L 58/14* (2019.01)

(52) U.S. Cl.
CPC .............. *B60L 58/18* (2019.02); *B64D 27/24* (2013.01); *H01M 2220/20* (2013.01)

(58) Field of Classification Search
CPC .......... B60L 58/18; B60L 58/14; Y02E 60/10; Y02T 10/70
USPC ........................................................ 320/137
See application file for complete search history.

(56) References Cited

U.S. PATENT DOCUMENTS

| | | | |
|---|---|---|---|
| 9,245,116 B2* | 1/2016 | Evans .................. | G05B 23/024 |
| 9,282,008 B2* | 3/2016 | Shah ...................... | H04L 63/00 |
| 9,434,270 B1* | 9/2016 | Penilla .................. | G06Q 10/20 |
| 9,806,318 B2* | 10/2017 | Holtappels .......... | H01M 50/249 |
| 10,797,497 B2* | 10/2020 | Steiner .................. | B60L 53/665 |
| 10,818,392 B1* | 10/2020 | Dalen .................. | G01R 31/382 |
| 11,101,677 B2* | 8/2021 | Shih ...................... | G01R 31/396 |
| 11,271,255 B2* | 3/2022 | Vickery .................. | B60L 53/68 |
| 2012/0303259 A1* | 11/2012 | Prosser .................. | B60L 53/57 |
| | | | 701/400 |
| 2019/0207393 A1* | 7/2019 | Shih ...................... | G01R 31/382 |
| 2020/0220366 A1* | 7/2020 | Steiner .................. | H02J 7/0045 |
| 2020/0250693 A1* | 8/2020 | Kanamori ............... | G06Q 50/06 |

* cited by examiner

Future Maintenance Schedule 400

|   | July 19 |   |   |   |   |   |
|---|---|---|---|---|---|---|
| M | T | W | T | F | S | S |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

|   | August 19 |   |   |   |   |   |
|---|---|---|---|---|---|---|
| M | T | W | T | F | S | S |
|   |   |   |   | 30 | 31 | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 |   |

- Battery 103 should receive X maintenance to maintain optimal health.
- Battery 402 should receive Y maintenance by July 20 to maintain optimal health.

SYSTEM AND METHOD FOR MAINTAINING A FLEET OF AIRCRAFT BATTERIES LOCATED AT MULTIPLE AIRPORTS

CROSS-REFERENCE TO RELATED APPLICATIONS

The present application is a continuation of U.S. patent application Ser. No. 16/399,929, filed on Apr. 30, 2019, the content of which is incorporated herein in its entirety.

FIELD

The disclosure relates to a system and method for maintaining a fleet of aircraft batteries located at multiple airports.

BACKGROUND

Vehicle battery packs are often structural components that have to withstand crash forces and/or cannot be easily swapped between vehicles. Such batteries are often bolted to the frame of the vehicle and are not exchanged regularly for charging.

Such vehicle batteries are charged and replaced when necessary, or in accordance with the average rate of failure. This may lead to replacing some batteries too soon, and others too late. Additionally, when batteries are charged as needed via high speed charging, batteries may be degraded leading to a shorter service life.

SUMMARY

One aspect of the disclosure relates to a system and method for maintaining a fleet of aircraft batteries located at multiple airports. Individual aircraft batteries within the fleet may be swapped (i.e., exchanged) between charging stations and/or different aircraft. The individual batteries may comprise battery packs having multiple batteries and/or separate and distinct batteries. The charging stations and/or individual aircraft may be located multiple airports in different locations. Predictions and/or determinations related to which batteries need to be re-allocated to other airports, which batteries need or will need maintenance, which batteries should be scheduled on which flights, true leasing costs, and/or other predictions and/or determinations may be made by the systems and/or methods described herein. The predictions and/or determinations may be made based on battery health information, charge information, flight schedule information, utility information, and/or other information for individual ones of the batteries within the fleet. The battery health information, charge information, flight schedule information, utility information, and/or other information for the individual batteries may be obtained (e.g., offloaded, pulled, uploaded, transferred, etc.) from the individual batteries and/or from the charging stations located at the multiple airports. An individual battery as used and described herein may include a battery pack comprising multiple batteries. In some implementations, the systems and methods described herein may apply to vehicle batteries in addition to and/or instead of aircraft batteries.

The battery health information may characterize and/or represent the degradation of individual batteries within the fleet of aircraft batteries. The battery health information for an individual battery may include and/or be determined based on location(s) of the battery, flight information for one of more individual flights the battery was used for (e.g., how much energy was used for individual flights, the distance of individual flights, the altitude flown during individual flights, what the individual flights were like (e.g., smooth, turbulent, speed, etc.), what temperature(s) the battery operated at during the individual flights, what humidity levels the battery operated at during individual flights, what pressures did the battery experience during individual flights, what external cooling air flow rate the battery experienced during individual flights, physical vibration and shocks experienced during flights, and/or other information), charge information (e.g., power input, quantity of charges, length(s) of charges, current charge level, and/or other charge information), historical battery life information (e.g., general or specific to one or more characteristics of the given battery), efficiency level, charge capacity, the pack and individual cell temperature profiles during the flights, thermal management system performance during flight, pack and cell level internal resistance/impedance data, a log of the pack's internal Battery Management System (BMS) faults, cell voltage stability or imbalance between cells, any internal shorts or episodes of cell thermal runaway experienced, and/or other information.

A system for maintaining a fleet of aircraft batteries located at multiple airports may include one or more servers and/or one or more client computing platforms. The server(s) and the client computing platform(s) may communicate in a client/server configuration, cloud computing configuration, and/or other configuration. The server(s) may include one or more processors configured by machine-readable instructions to execute computer program components. The computer program components may include a charge information component, battery health information component, flight schedule information component, utility information component, prediction component, management component, leasing component, presentation component, and/or other components.

The charge information component may be configured to obtain charge information for individual batteries within the fleet of aircraft batteries. The charge information may include charge statuses of the individual batteries. The charge information may be obtained from charging containers. The charging containers may be located at individuals ones of the multiple airports. In some implementations, the charge information may be obtained from one or more of the individual batteries instead of, or in addition to, the charging containers.

The battery health information component may be configured to obtain battery health information for individual batteries within the fleet of aircraft batteries. The battery health information may characterize the degradation of the individual batteries over time. In some implementations, the battery health information for an individual battery may include and/or be determined based on location(s) of the battery, flight information for one of more individual flights the battery was used for, charge information, historical battery life information, efficiency level, charge capacity, time of day and duration of charging, temperature at which charging occurred, cell balancing data battery internal resistance/impedance data (wherein responsive to the battery included a battery pack, the battery internal resistance/impedance data may include internal resistance/impedance data at a pack level and/or a battery cell level), a BMS (Battery Management System) performance log (e.g., including performance information of the batteries, health information for the BMS sensors, and/or other information), and/or other information. The cell balancing data may include data on the differences in voltages between cells and/or other information. For example, over time battery cells may become "out of balance" such that some cells degrade (i.e., drop voltage) faster than others. Cell balancing data may be obtained by monitoring battery cells and ensuring that they charge and/or discharge evenly. Cells becoming out of balance may be a telltale sign of degradation and/or impending failure. In some implementations, the battery health information may be pulled from one or more individual batteries. For example, the battery health information may be pulled from the batteries while they charge in the charging stations.

The flight schedule information component may be configured to obtain flight schedule information. The flight schedule information may be for multiple airports located in separate and/or distinct locations. The flight schedule information may include flight times, flight departure location information, flight arrival location information, flight durations, flight power requirements, and/or other information characterizing one or more flights and/or scheduled flights to and/or from the multiple airports utilizing the individual batteries in the fleet. The flight schedule information may be used to determine a battery management plan for one or more of the batteries in the fleet of aircraft batteries, allocations of individual batteries to individual flights, a future maintenance schedule for one or more individual batteries within the fleet of aircraft batteries, and/or other fleet management outputs.

The utility information component may be configured to obtain utility information. The utility information may characterize the cost and/or availability of power (i.e., electricity) at the individual ones of the multiple airports. By way of non-limiting example, the utility information may indicate peak and/or off peak times for electricity usage. In some implementations, the utility information may include green energy potential information. Green energy potential information may characterize the availability of renewable and/or green energy (e.g., solar power, wind power, and/or other types of renewable or green energy). Green energy potential information may enable maximization of green energy usage to charge the batteries.

The prediction component may be configured to determine predictions for the one or more batteries. The predictions may indicate one or more batteries to be re-allocated, one or more batteries to receive maintenance, and/or other predictions for managing the fleet of batteries. The predictions may be determined based on the battery health information, the charge information, the flight schedule information, the utility information, and/or other information. Predictions recommending one or more batteries to be re-allocated may include information identifying the one or more batteries to be reallocated, the current locations of the one or more batteries to be re-allocated, the locations the one or more batteries should be re-allocated to, information indicating why the one or more batteries should be reallocated, a timeframe and/or date by which the one or more batteries should be reallocated, and/or other information.

Predictions recommending one or more batteries to receive maintenance may include information identifying the one or more batteries that should receive maintenance, the location of the one or more batteries that should receive maintenance, the type and/or maintenance services the one or more batteries may need, a timeframe and/or date by which the maintenance should be performed, and/or other information. In some implementations, the predictions of the one or more batteries to be re-allocated and/or to receive maintenance may be determined via machine learning.

The management component may be configured to generate a battery management plan. The battery management plan may characterize how individual ones of the batteries within the fleet of batteries should be allocated and/or indicate when individual ones of the batteries in the fleet of batteries should receive maintenance in order to improve and/or optimize the life of the batteries, reduce and/or optimize the electricity used by the charging stations to charge the batteries, improve and/or optimize the efficiency of swapping the batteries between aircraft and/or locations, and/or otherwise optimally manage the fleet of batteries. The battery management plan may include the one or more predictions recommending the one or more batteries to be re-allocated, to receive maintenance, and/or other indications regarding the batteries.

In some implementations, the management component may be configured to determine allocations of individual batteries within the fleet of aircraft batteries to individual flights on individual aircraft. Allocations of the individual batteries to individual flights may include assignments of the individual batteries to individual flights on individual aircraft. The management component may be configured to generate a distribution plan including one or more of the allocations of the individual batteries within the fleet of aircraft batteries to individual flights on individual aircraft.

In some implementations, the management component may be configured to determine a future maintenance schedule for one or more individual batteries within the fleet of aircraft batteries. The future maintenance schedule may comprise a predictive schedule of maintenance for individual batteries in the fleet aircraft batteries. The future maintenance schedule may include multiple predictions of batteries to receive maintenance.

The leasing component may be configured to determine leasing information characterizing leasing costs for a segment of batteries. The leasing information may be determined based on the battery health information for the segment of batteries.

The presentation component may be configured to effectuate presentation of the battery management plan, the distribution plan, a future maintenance schedule, one or more allocations of the individual batteries, one or more of the predictions, and/or other information via a graphical user interface.

In some implementations, the system may comprise a jack for exchanging individual batteries within the fleet of aircraft batteries between individual aircraft and/or the charging containers. The jack may facilitate the exchange of individual batteries between individual aircraft and/or the charging containers according to the distribution plan.

In some implementations, the system may comprise charging containers. Individual ones of the charging containers may include multiple charging stations, an external charging port and/or plug, and/or other components. The multiple charging stations may include universal fleet charging ports that correspond to universal fleet charging plugs on the individual batteries and/or universal fleet charging plugs that correspond to universal fleet charging ports on the individual batteries. The external charging port and/or plug may be configured to couple with a location standard charging port and/or plug. The location standard charging port and/or plug for a given charging container may correspond to the location of the charging station.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise. As used in the specification and in the claims, the terms "individual batteries", "batteries", and "battery" may include battery pack(s) comprising multiple battery cells and/or single batteries.

DETAILED DESCRIPTION

Figure 1:
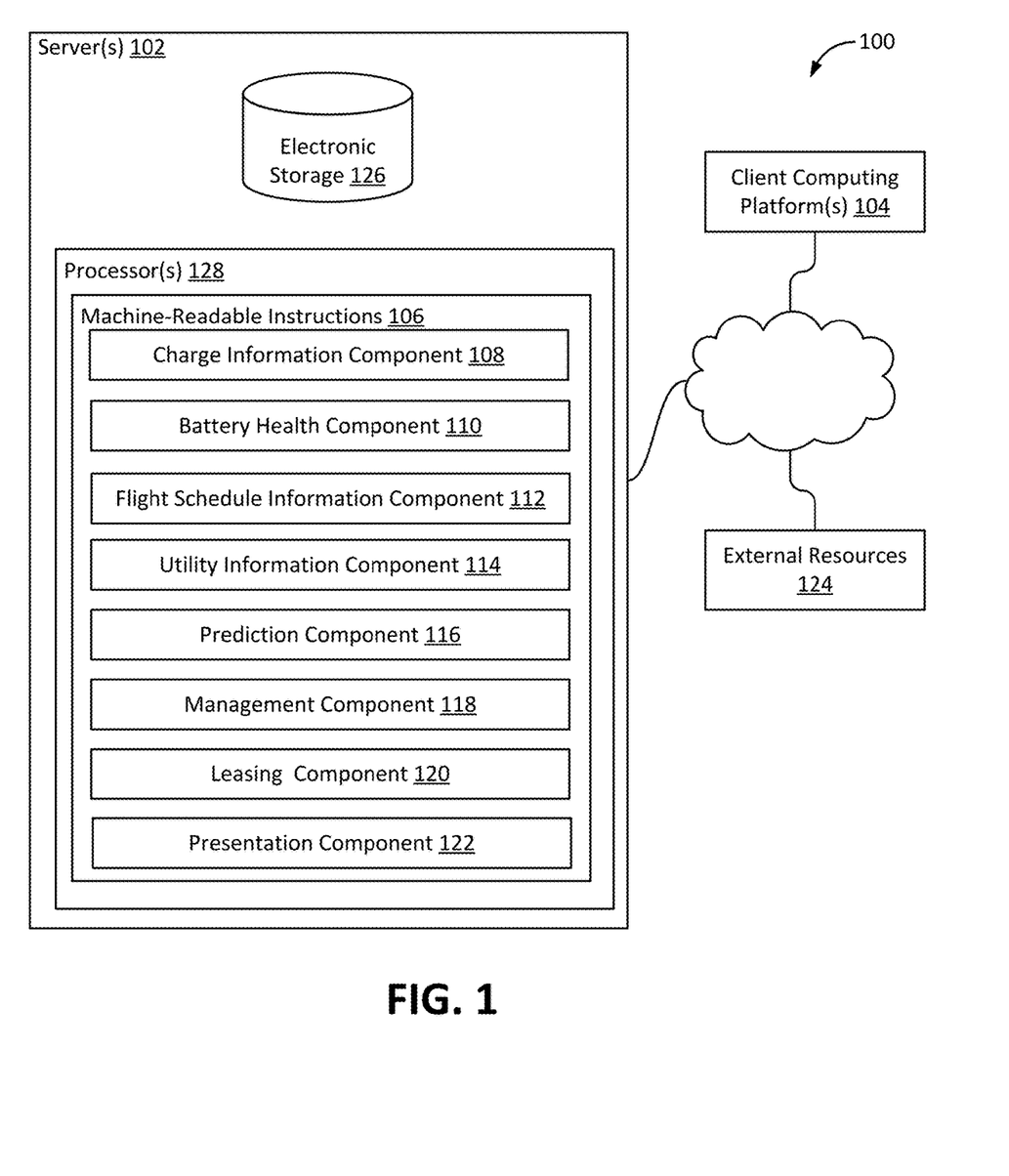
FIG. 1 illustrates a system for maintaining a fleet of aircraft batteries located at multiple airports, in accordance with one or more implementations.

FIG. 1 illustrates a system 100 for maintaining a fleet of aircraft batteries located at multiple airports, in accordance with one or more implementations. In some implementations, system 100 may include one or more servers 102. The server(s) 102 may be configured to communicate with one or more client computing platforms 104 (e.g., the charging containers, connected to the charging containers, and/or communicating with the charging containers) according to a client/server configuration, cloud computing configuration, and/or other configuration. The server(s) 102 may include one or more processors configured by machine-readable instructions 106. Machine-readable instructions 106 may include one or more instruction components. The instruction components may include computer program components. The instruction components may include one or more of a charge information component 108, a battery health information component 110, a flight schedule information component 112, a utility information component 114, a prediction component 116, a management component 118, a leasing component 120, a presentation component 122, and/or other components.

Charge information component 108 may be configured to obtain charge information. The charge information may include charge statuses of the individual batteries within the fleet of aircraft batteries. The charge statuses may indicate the charge level and/or an amount of power a given battery has at a given time, whether a given battery is currently charging, how long a given battery has been charging, how long a given battery will or still needs to charge, how far a given batter can travel at the current charge level, and/or other charge statuses.

In some implementations, the charge information may be obtained from charging containers that are configured to charge the batteries. The charging containers may be located at individual ones of the multiple airports. In some implementations, the charge information may be obtained from one or more of the individual batteries in addition to or instead of from the charging containers.

Battery health information component 110 may be configured to obtain battery health information for individual batteries within the fleet of aircraft batteries. The battery health information may represent the battery health and/or life of the battery. The battery health information may characterize the degradation of the individual batteries over time. In some implementations, the battery health information for an individual battery may include and/or be determined based on location(s) of the battery, flight information for one of more individual flights the battery was used for, charge information, historical battery life information, efficiency level, charge capacity, energy usage (e.g., on recent flights), temperature and/or humidity of the battery on recent flights, vibration and shock conditions experienced on recent flights, and/or other information.

The batteries may store at least a portion of the battery health information locally and/or offload at least a portion of the battery health information to the charging station(s). In some implementations, the battery health information may be pulled from one or more individual batteries and/or charging stations. For example, the battery health information may be pulled from the batteries via a Bluetooth data offload while the batteries charge in the charging stations.

Flight schedule information component 112 may be configured to obtain flight schedule information. The flight schedule information may include flight times, flight departure location information, flight arrival location information, flight durations, flight power requirements, flight quantities, and/or other information characterizing one or more flights and/or scheduled flights to and/or from the multiple airports utilizing the batteries within the fleet of batteries. The flight schedule information may be obtained for multiple airports located in separate and/or distinct locations.

The flight schedule information may be used to determine a battery management plan for one or more of the batteries in the fleet of aircraft batteries, allocations of individual batteries to individual flights, a future maintenance schedule for one or more individual batteries within the fleet of aircraft batteries, lease information, and/or other fleet management outputs.

Utility information component 114 may be configured to obtain utility information. The utility information may characterize the cost and/or availability of power (i.e., electricity) needed to charge batteries within the fleet of batteries at the individual ones of the multiple airports. The utility information may indicate cost, availability, restrictions, peak and/or off peak times for electricity usage, green energy potential information, and/or other utility information.

Green energy potential information may indicate the availability, quantity, and/or cost of available renewable and/or green energy. Renewable and/or green energy may include, for example, solar power, wind power, and/or other types of renewable or green energy. In some implementations, the green energy potential information may indicate how much energy is stored and/or available from solar panels installed on the charging containers. In some implementations, the green energy potential information may indicate how much energy and/or the cost of green/renewable energy that may be obtained from the grid in a given location.

Prediction component 116 may be configured to determine predictions for the one or more batteries. The predictions may be used as a basis for determining one or more of a battery management plan, distribution plan, future maintenance schedule, leasing information output, and/or other system outputs. The predictions may indicate and/or recommend one or more batteries to be re-allocated, one or more batteries to receive maintenance, a schedule of future maintenance, and/or other predictions for managing the fleet of batteries. The predictions may be determined based on the battery health information, the charge information, the flight schedule information, the utility information, and/or other information.

The predictions may be used to identify issues (e.g., problem batteries, failing batteries, batteries degrading more quickly than normal, and/or other issues) with the individual batteries within the fleet of batteries. This enables the system to catch problems before they become problems without replacing batteries too early, or overestimating and performing maintenance and/or battery replacement out of an abundance of caution.

Predictions recommending one or more batteries to be re-allocated may include information identifying the one or more batteries to be reallocated, the current locations of the one or more batteries to be re-allocated, the locations the one or more batteries should be re-allocated to, information indicating why the one or more batteries should be reallocated, a timeframe and/or date by which the one or more batteries should be reallocated, and/or other information.

Predictions recommending one or more batteries to receive maintenance may include information identifying the one or more batteries that should receive maintenance, the location of the one or more batteries that should receive maintenance, the type and/or maintenance services the one or more batteries may need, a timeframe and/or date by which the maintenance should be performed, and/or other information.

In some implementations, the predictions of the one or more batteries to be re-allocated and/or to receive maintenance may be determined via machine learning. Machine learning may enable system 100 to learn and improve from experience without being explicitly programmed. Machine learning builds and uses algorithms that receive input data and use statistical analysis to make output predictions. The output may be updated as new data is available. Machine learning may include supervised learning, unsupervised learning, semi-supervised learning, reinforcement learning, and/or other types of machine learning. In some implementations, machine-learning may include neural networks. Prediction component 116 may be configured to determine one or more predictions based on a machine learning model using battery health information, flight schedule information, utility information, and/or other information as input data.

Management component 118 may be configured to generate a battery management plan. The battery management plan may characterize how individual ones of the batteries within the fleet of batteries should be allocated and/or indicate when individual ones of the batteries in the fleet of batteries should receive maintenance in order to improve and/or optimize the life of the batteries, reduce and/or optimize the electricity used by the charging stations to charge the batteries, improve and/or optimize the efficiency of swapping the batteries between aircraft and/or locations, and/or otherwise optimally manage the fleet of batteries.

The battery management plan may include the statuses of individual batteries, one or more predictions, and or other information. The one or more predictions may include predictions recommending one or more batteries to be re-allocated, one or more batteries to receive maintenance, and/or other predictions.

In some implementations, management component 118 may be configured to determine allocations of individual batteries within the fleet of aircraft batteries to individual flights on individual aircraft. The allocations may be determined in a manner that improves and/or optimizes battery health and/or fleet power usage, and/or reduces and/or optimizes required maintenance. Allocations of the individual batteries to individual flights may include assignments of the individual batteries to individual flights on individual aircraft. The management component may be configured to generate a distribution plan including one or more of the allocations of the individual batteries within the fleet of aircraft batteries to individual flights on individual aircraft. In some implementations, the distribution plan may allocate all or some of the batteries within the fleet of batteries to various aircraft flying to various airports. For instance, dynamic repositioning of batteries may enable adjustment to seasonally varying flight schedules or the need for a particular airport to increase flight volume in response to a natural disaster or similar event. By way of non-limiting example, batteries in certain climates may require pre-conditioning before flights. For example, batteries may need to be pre-warmed prior to flights on cold days, which may need to be taken into account in the management system in terms of its effect on battery availability. Pre-warming may improve performance and/or energy consumption of the pack in flight because internal resistance would be lower so less energy is needed to takeoff due to higher efficiency and less energy lost to heat.

Figure 2:
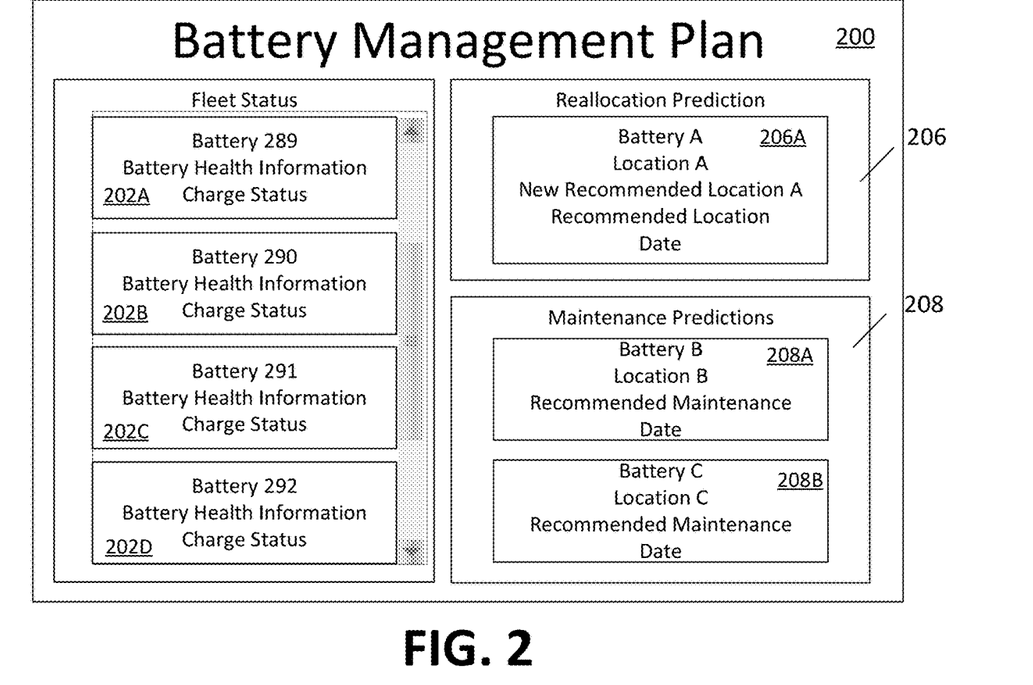
FIG. 2 illustrates a battery management plan, in accordance with one or more implementations.

FIG. 2 illustrates a battery management plan, in accordance with one or more implementations. Battery management plan 200 may include statuses 202 of the individual batteries (or battery packs) in the fleet of aircraft batteries. For example, status 202A may indicate the status of battery 289. The statuses may include battery identifying information, battery health information, charge status, location information, and/or other information. Battery management plan 200 may include one or more relocation predictions 206, maintenance predictions 208, and/or other predictions. Relocation prediction 206A may include battery identifying information, location information (indicating the current location of the battery), a new recommended location, a date by which the battery should be relocated, and/or other information. Maintenance predictions 208 may include battery identifying information, location information (indicating the current location of the battery), the recommended maintenance, a date by which the recommended maintenance should be completed, and/or other information.

Figure 3:
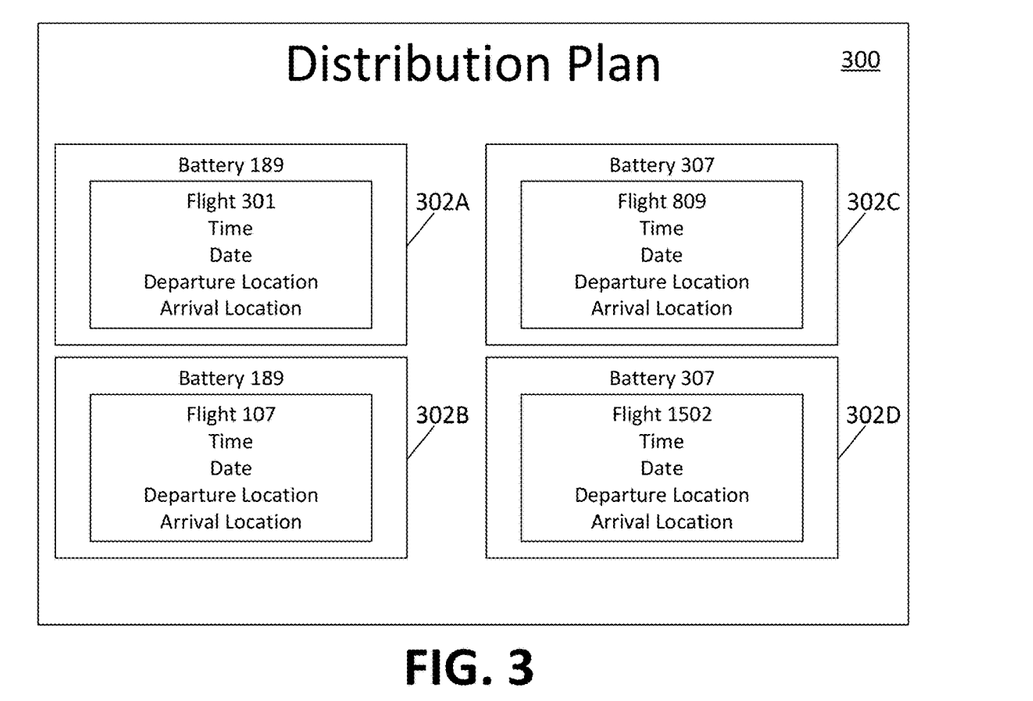
FIG. 3 illustrates a distribution plan, in accordance with one or more implementations.

FIG. 3 illustrates a distribution plan, in accordance with one or more implementations. Distribution plan 300 may include allocations 302 of the individual batteries within the fleet of aircraft batteries to individual flights on individual aircraft. Allocations 302 may include battery identifying information, flight identifying information (e.g., a flight number), a flight time, a flight date, the flight departure location, the flight arrival location, power requirements, swapping instructions (indicating which batteries on which aircraft should be swapped), and/or other information.

Returning to FIG. 1, in some implementations, management component 118 may be configured to determine a future maintenance schedule for one or more individual batteries within the fleet of aircraft batteries. The future maintenance schedule may include one or more predictions of batteries that should receive maintenance prior to the batteries failing and/or requiring maintenance. The future maintenance schedule may include a predictive schedule of maintenance for individual batteries in the fleet aircraft batteries. The future maintenance schedule may improve costs and/or battery life by initiating maintenance based on information specific to the individual batteries within the fleet of batteries rather than an average (which inherently means some maintenance may be provided to early and/or too frequently). The future maintenance schedule may be determined based on the charge information, the battery health information, the flight schedule information, and/or other information for the individual batteries within the fleet of aircraft batteries. By way of non-limiting example, batteries in temperate climates may not require maintenance as often as batteries in harsher climates. By way of non-limiting example, batteries used for short routes, where the battery is not fully discharged in typical operation, may last significantly longer than batteries used for longer routes that are more heavily cycled. Conversely, batteries experiencing more frequent landing/takeoff cycles per flight hour could have more rapid mechanical wear and crack formation for a given number of flight hours than batteries used on longer routes. Rather than establishing fixed maintenance cycles for all batteries, prioritizing specific inspection and maintenance actions as appropriate for batteries used in a particular mission type and climate is more efficient.

Figure 4:
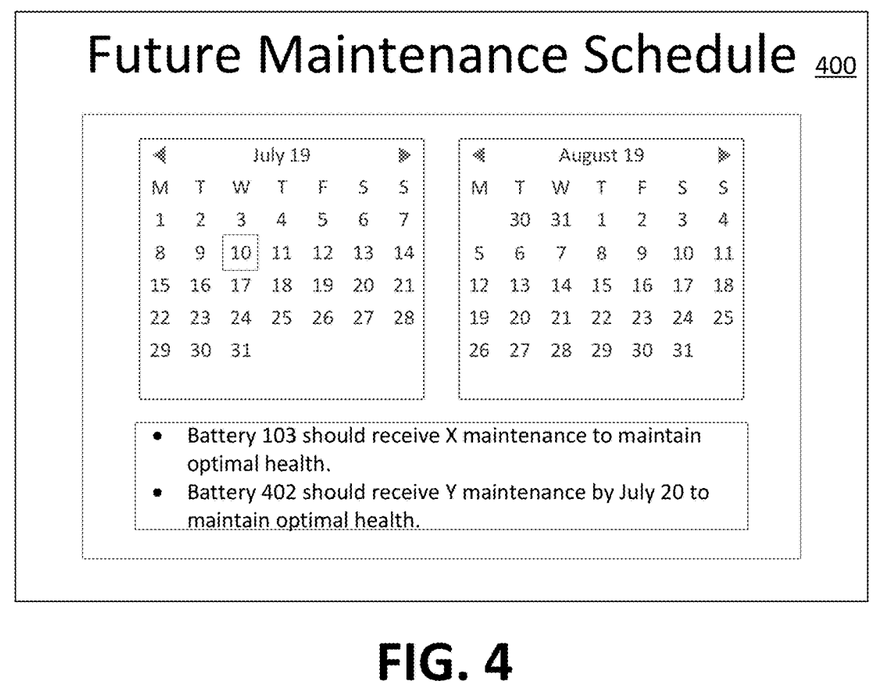
FIG. 4 illustrates a future maintenance schedule, in accordance with one or more implementations.

FIG. 4 illustrates a future maintenance schedule, in accordance with one or more implementations. Future maintenance schedule 400 may include a calendar 402. Future maintenance schedule 400 may include one or more maintenance predictions 404 recommending predictive maintenance that should be performed on individual ones of the batteries within the fleet of aircraft batteries in the future. In some implementations, maintenance predictions 404 may indicate a date by which the maintenance should be performed and/or a reason the maintenance should be performed.

Returning to FIG. 1, leasing component 120 may be configured to determine leasing information characterizing leasing costs for a segment of batteries. The leasing information may be determined based on the battery health information for the segment of batteries. Some airlines and/or lessors of the aircraft batteries may cause faster than average degradation of the aircraft batteries. As such, these lessors should pay more based on how the lessors use and/or degrade the batteries. Leasing component 120 may be configured to determine such leasing information based on battery health information for a segment of batteries used by a given lessor.

Figure 5:
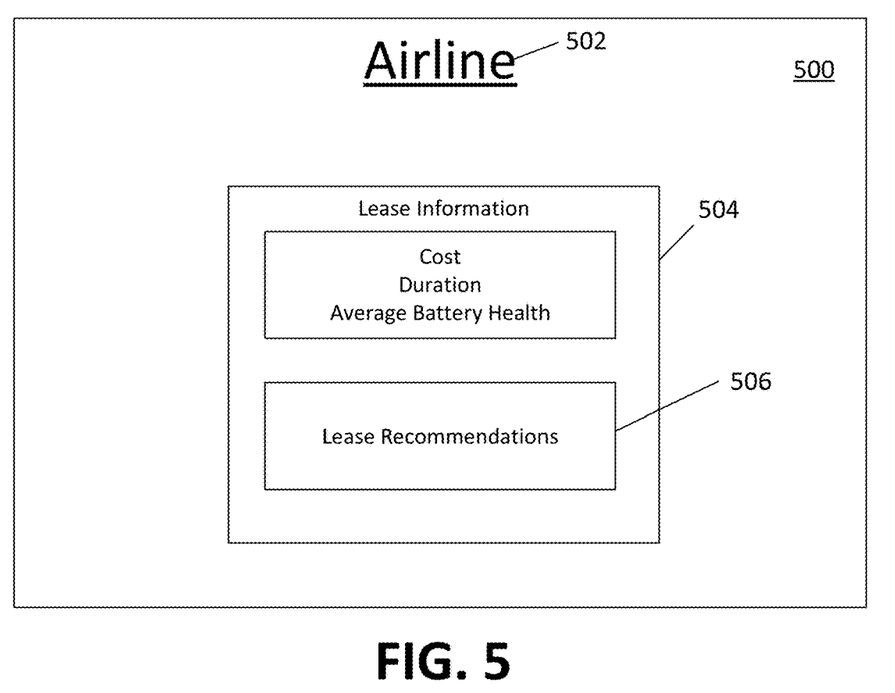
FIG. 5 illustrates leasing information output, in accordance with one or more implementations.

FIG. 5 illustrates leasing information output, in accordance with one or more implementations. Leasing information output 500 may indicate a lessor 502 and lease information 504. Lease information 504 may include a lease cost and/or rate, a lease duration, an average battery health and/or degradation rate, and one or more lease recommendations 506. Lease recommendations 506 may include cost recommendations.

Returning to FIG. 1, presentation component 122 may be configured to effectuate presentation of the battery management plan, the distribution plan, a future maintenance schedule, one or more allocations of the individual batteries, one or more of the predictions, the leasing information output, and/or other information via a graphical user interface. The graphical user interface may be presented via one or more client computing platforms 104.

Figure 6:
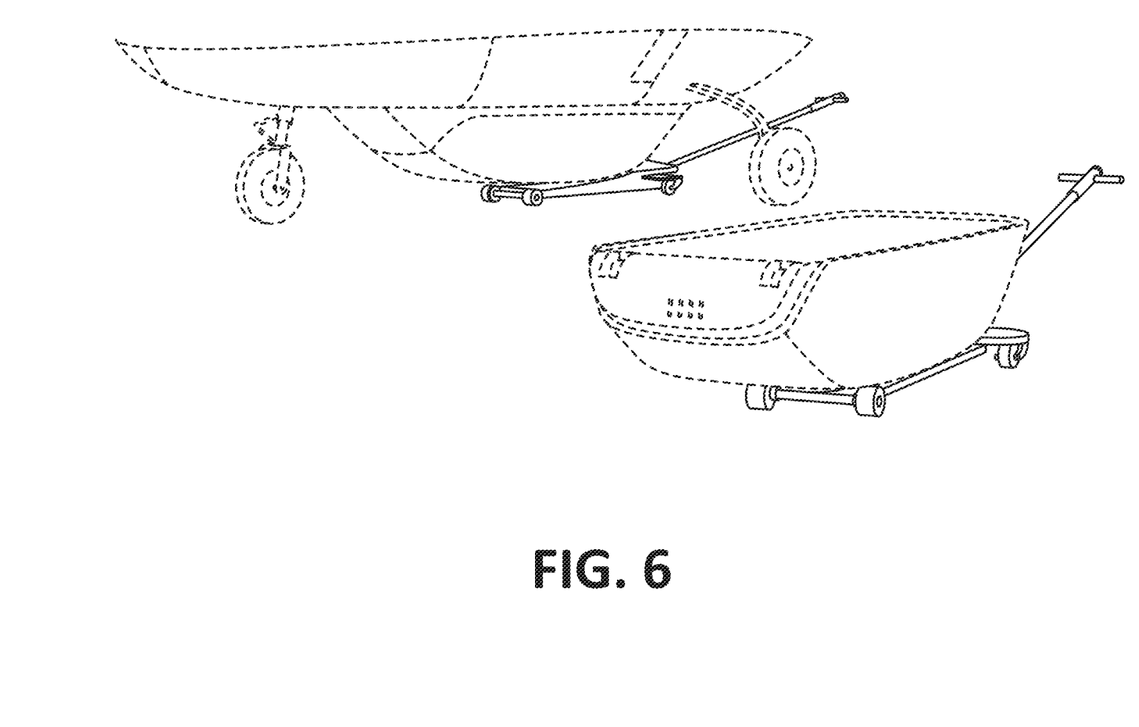
FIG. 6 illustrates a jack, in accordance with one or more implementations.

FIG. 6 illustrates a jack, in accordance with one or more implementations. Jack 600 may be used to unload a used battery (e.g., belly-mounted battery pack) from an aircraft 602, and/or load a charged battery (e.g., belly-mounted battery pack) onto the aircraft 602. Jack 600 may comprise wheels 604. Jack 600 may comprise a hydraulic lift system, an electro-hydraulic lift system, electric lift system, and/or other lift systems. In some implementations, the battery may be inserted and removed from the aircraft by prongs horizontally rather than lowered by a jack, and inserted into the charging container in a similar manner. In some implementations, jack 600 may be self-propelled and/or pushed by an operator to move batteries between different aircraft and/or charging container(s).

Figure 7:
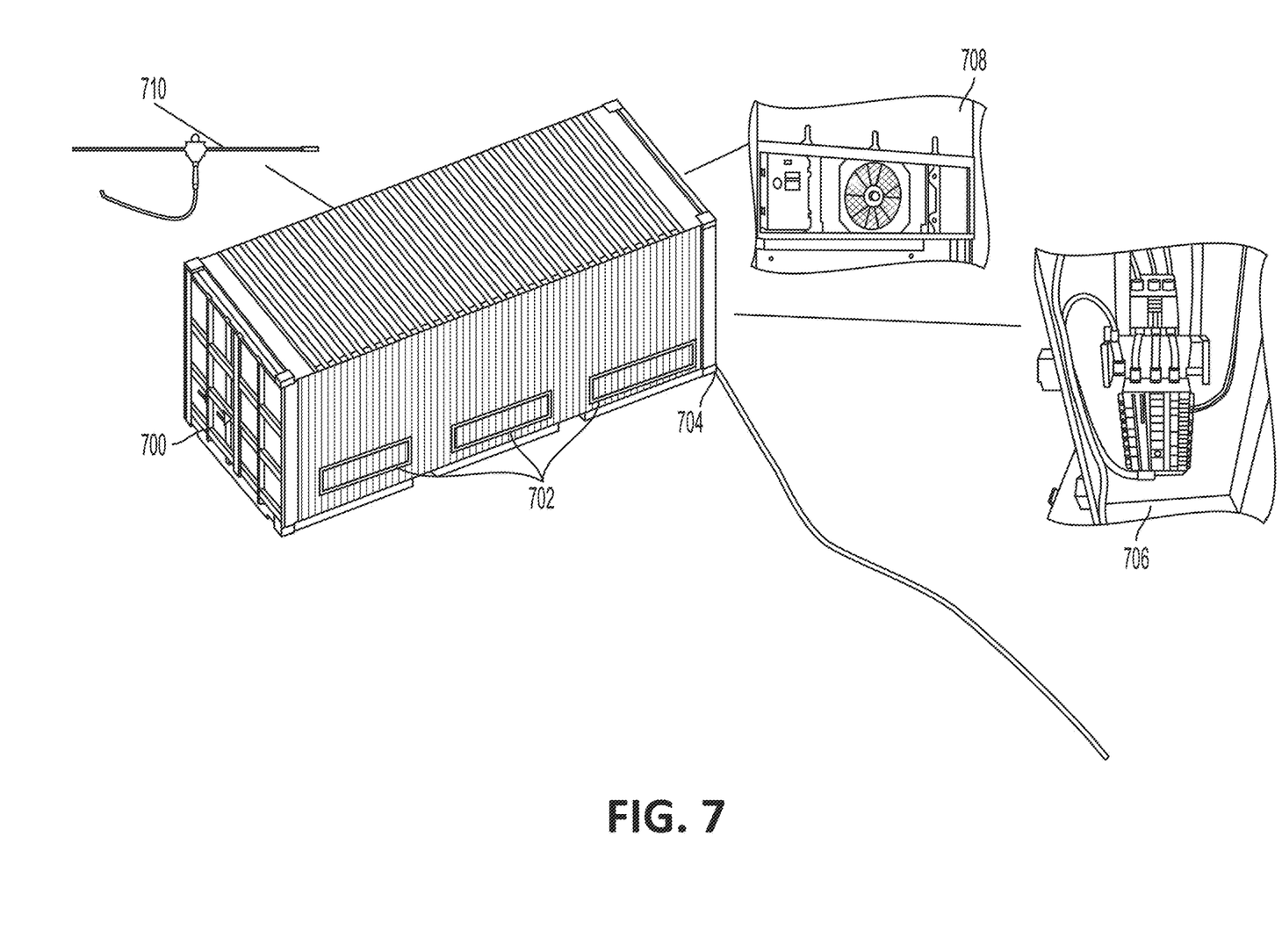
FIG. 7 illustrates a charging container, in accordance with one or more implementations.

FIG. 7 illustrates a charging container, in accordance with one or more implementations. Charging container 700 may include one or more charging stations 702. Charging stations 702 may comprise universal fleet charging ports that correspond to universal fleet charging plugs on the individual batteries and/or universal fleet charging plugs that correspond to universal fleet charging ports on the individual batteries. In some implementations, the charging stations 702 may include flapped holes in charging container 700. The individual batteries may be inserted (e.g., by a jack the same as or similar to jack 600) into the charging stations 702 for charging and/or removed for loading on to an aircraft. Charging container 700 may comprise a grid power connection 704. Grid power connection 704 may include an external charging port and/or plug configured to couple with a location standard charging port and/or plug corresponding to the location of the charging station. As such, for example, charging container 700 may be universal across multiple airports in different locations, except for the grid power connection 704 which may be location specific (e.g., an external charging port and/or plug configured to connect to the grid to receive power).

In some implementations, charging container 700 may comprise a smart conversion box 706 that converts AC grid power to DC power for the individual batteries. Smart conversion box 706 may control the timing of the power draw from the grid to the batteries, regulate the power provided to the individual batteries, and/or regulate the power provided to thermal control unit 708. In some implementations, smart conversion box 706 may control the charging of the individual batteries based on demand and/or peak power times, battery health information, battery charge status, and/or other information. Smart conversion box 706 may provide a low power and/or trickle charge to one or more batteries to enable lighter batteries and/or enhance battery service life.

Charging container 700 may include thermal control unit 708. Thermal control unit 708 may control the temperature, pressure, and/or humidity of charging container 700. In some implementations, thermal control unit may include one or more solar panels 710. Thermal control unit 708 may be configured to provide heating in cold climates, cooling in hot climates, and/or air conditioning in variable climates. In some implementations, charging container 700 may be thermally insulated. Thermal control may also be provided either in addition to on in lieu of a whole-container system by provisions for individual pack thermal management. For instance a cold plate or heater may be incorporated adjacent to the charging stations 702, which could provide precise control for different batteries (for instance, batteries in the high-power stage of their charging cycle may require additional cooling). By way of non-limiting example, batteries in certain climates may require pre-conditioning before flights—for instance battery pre-warming prior to flight in a cold climate. However, it may not be advantageous or energy-efficient to warm the entire container/all packs to the same degree as the particular pack that is about to be installed on an aircraft.

Charging container 700 may include a communication unit 710 for transmitting and/or communicating charge information to system 100. In some implementations, charging container 700 may include a satcom antenna (see e.g., communication unit 710) for uploading charging information to a global network (e.g., system 100). Charging container 700 may be configured to collect charge information and/or battery health information from the individual batteries (e.g., battery packs and/or single batteries) on a continuous or semi-continuous basis. Charging container 700 may be configured to communicate with charge information component 108, battery health component 110, flight schedule information component 112, utility information component 114, prediction component 116 and/or management component 118.

Figure 8:
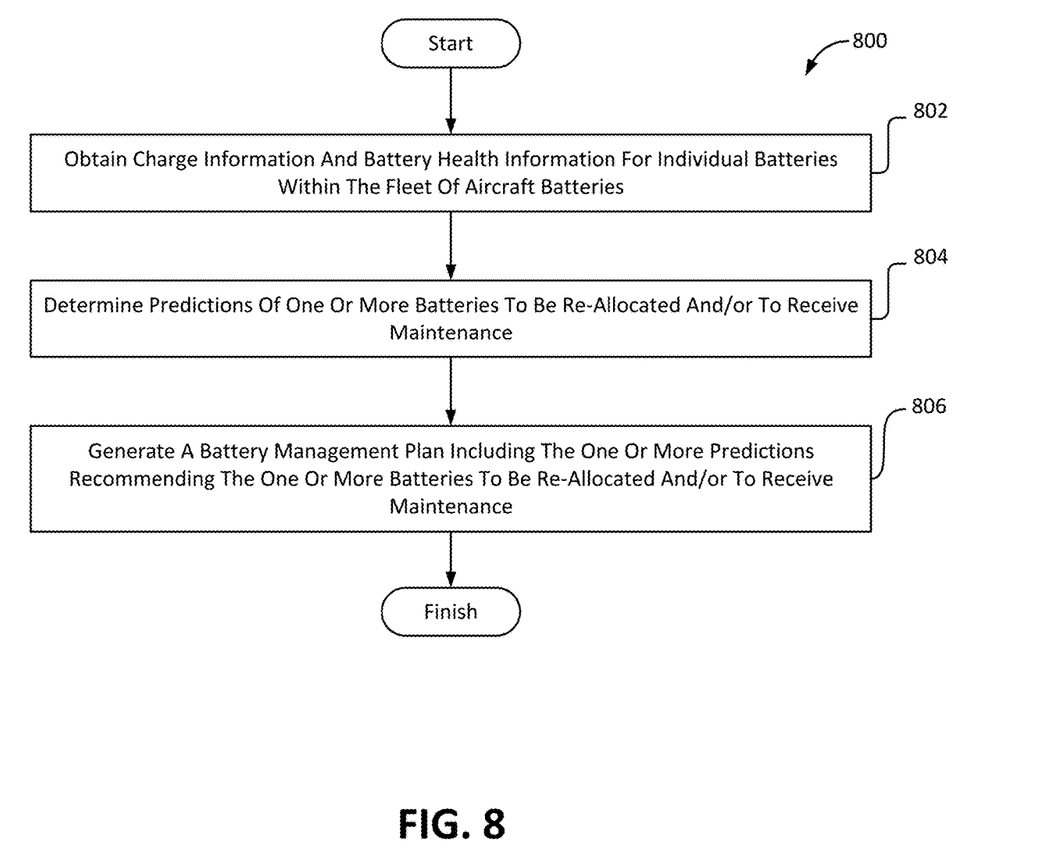
FIG. 8 illustrates a method for maintaining a fleet of aircraft batteries located at multiple airports, in accordance with one or more implementations.

FIG. 8 illustrates a method for maintaining a fleet of aircraft batteries located at multiple airports, in accordance with one or more implementations. The operations of method 800 presented below are intended to be illustrative. In some embodiments, method 800 may be accomplished with one or more additional operations not described, and/or without one or more of the operations discussed. Additionally, the order in which the operations of method 800 illustrated in FIG. 8 and described below is not intended to be limiting.

In some embodiments, method 800 may be implemented by one or more components of a system and method for maintaining a fleet of aircraft batteries located at multiple airports. The one or more components of a parallel hybrid aircraft may include one or more of a charge information component, battery health information component, flight schedule information component, utility information component, prediction component, management component, leasing component, presentation component, a jack, one or more charging containers, and/or other components.

At an operation 802, the system may be configured to obtain charge information, battery health information, and/or other information for individual batteries within the fleet of aircraft batteries. The charge information, battery health information, and/or other information may be obtained from charging containers located at individuals ones of the multiple airports. The charge information may include charge statuses of the individual batteries within the fleet of aircraft batteries. The battery health information may characterize the degradation of the individual batteries over time. In some implementations, operation 802 may be performed by a charge information component and/or a battery health component the same as or similar to charge information component 108 and/or a battery health component 110 (shown in FIG. 1 and described herein).

At an operation 804, the system may be configured to determine predictions of one or more batteries to be re-allocated and/or to receive maintenance. The predictions may be determined based on the battery health information. In some implementations, operation 804 may be performed by a prediction component the same as or similar to prediction component 116 (shown in FIG. 1 and described herein).

At an operation 806, the system may be configured to generate a battery management plan. The battery management plan may include the one or more predictions recommending one or more batteries to be re-allocated and/or to receive maintenance. In some implementations, operation 806 may be performed by a management component the same as or similar to management component 118 (shown in FIG. 1 and described herein).

Figure 9:
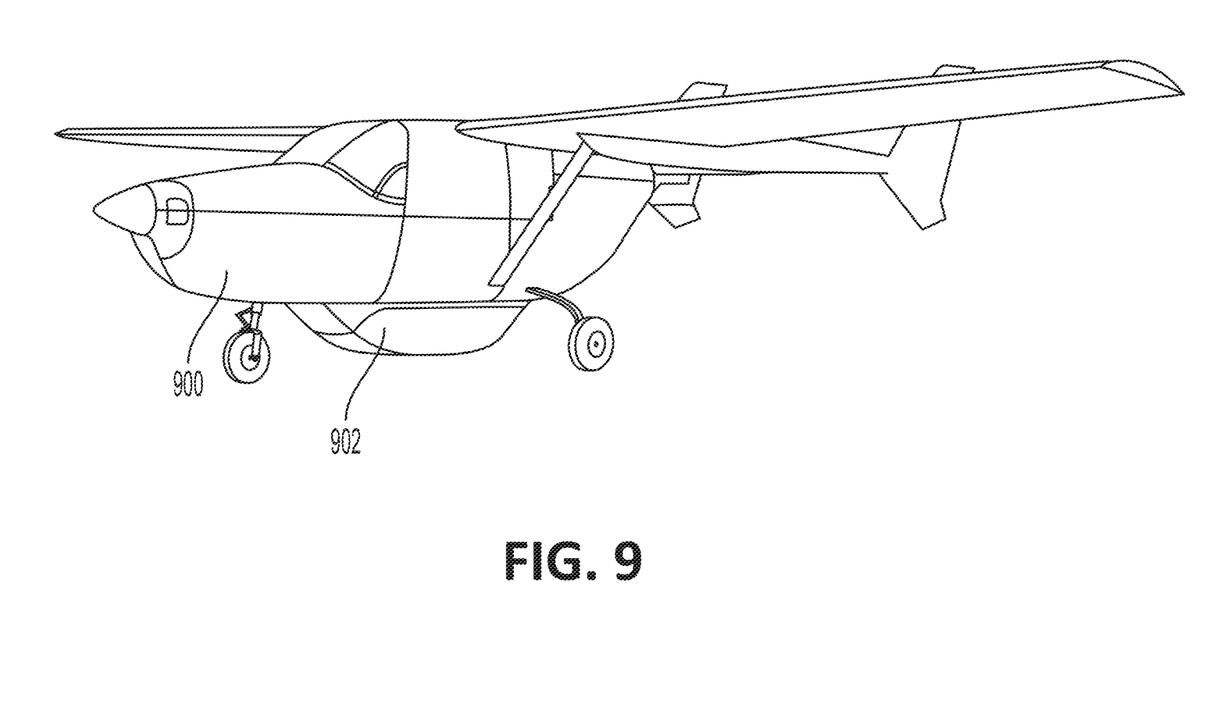
FIG. 9 illustrates an aircraft with a swappable belly-mounted battery pack, in accordance with one or more implementations.

FIG. 9 illustrates an aircraft with a swappable belly-mounted battery pack, in accordance with one or more implementations. Aircraft 900 may include a belly-mounted battery pack 902 coupled to the underside and/or belly of aircraft 900. Belly-mounted battery pack 902 not be a structural component of aircraft 900. For example, belly-mounted battery pack 902 may be carried by aircraft 900 as a payload. Unlike automobile battery packs which have to maintain ground clearance and/or be able to withstand crash forces, belly-mounted battery pack 902 may protrude from the underside of the aircraft and/or can be ejected in the case of an imminent crash, belly landing, fire, or other issue. The positioning of the belly-mounted battery pack 902 maintains a low center of gravity for the aircraft.

Figure 10:
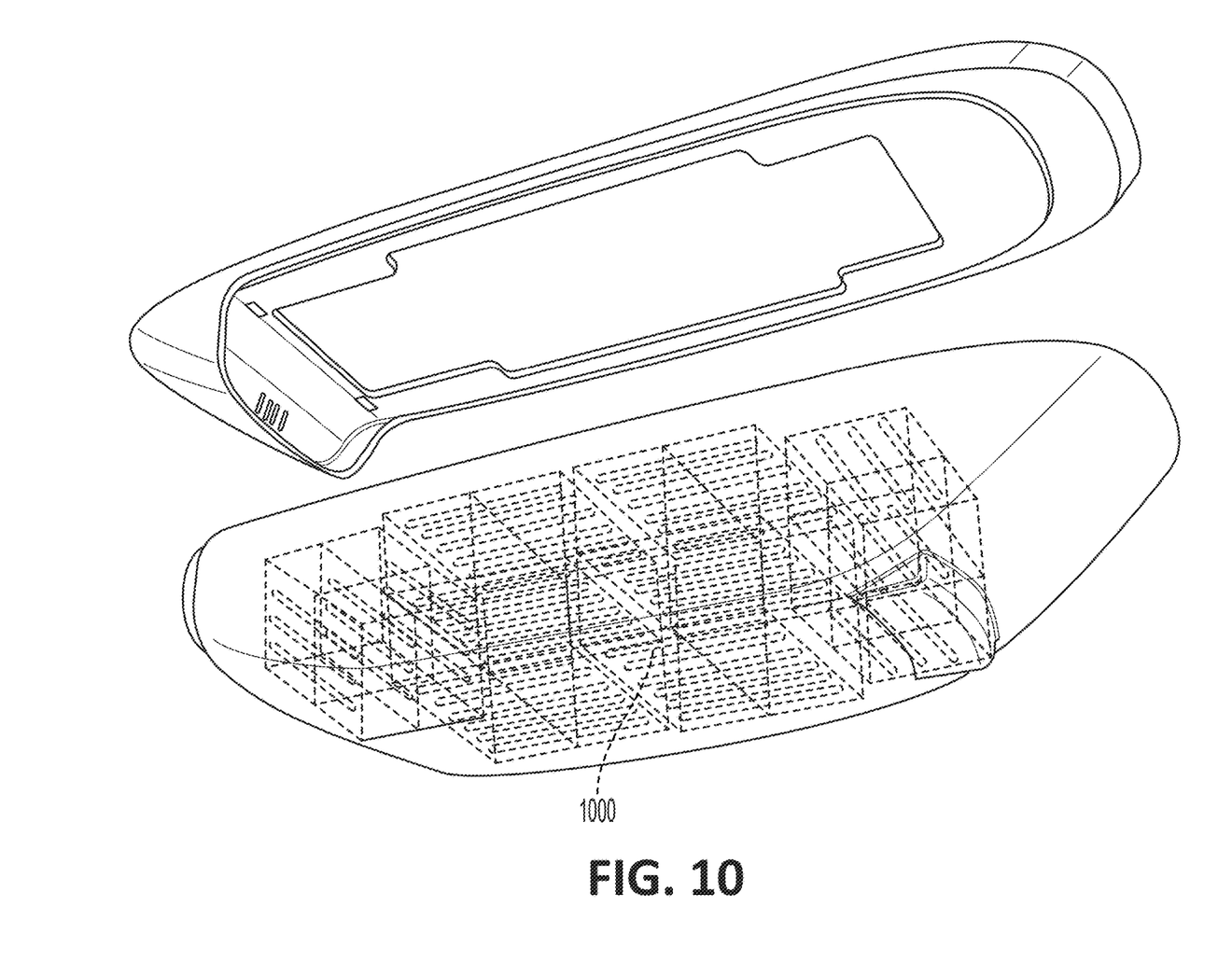
FIG. 10 illustrates a swappable belly-mounted battery pack, in accordance with one or more implementations.

FIG. 10 illustrates a swappable belly-mounted battery pack, in accordance with one or more implementations. The swappable belly-mounted battery pack 1000 may include multiple battery cells 1001 arranged inside belly-mounted battery pack 1000. By way of non-limiting example, the battery cells may be arranged to vent downward in the belly pod, away from the aircraft structure, for safety. The individual batteries within the fleet of aircraft batteries described herein may include individual belly-mounted battery packs (similar to belly-mounted battery pack 1000) comprising multiple batteries. Belly-mounted battery pack 1000 may be configured to mount to the underside or belly of the aircraft. Belly-mounted battery pack 1000 may couple to the aircraft via a release mechanism 1002. Release mechanism 1002 may be electrical and/or mechanical. The release mechanism may be configured such that belly-mounted battery pack 1000 may be quickly released, removed, and/or swapped with another belly-mounted battery pack. Batteries mounted in wings and/or in other critical areas (instead of the belly) of the aircraft may cause significant safety concerns in the event of a fire or crash landing. Belly-mounted battery pack 1000 may be ejected via the release mechanism for safety reasons such as an imminent belly landing, fire, and/or other safety concern.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for maintaining a fleet of aircraft batteries located at multiple airports, the system comprising:

charging containers with multiple charging stations having universal fleet charging ports that correspond to one or both of universal fleet charging plugs on the individual batteries and multiple charging stations with universal fleet charging plugs that correspond to universal fleet charging ports on the individual batteries; and one or both of an external charging port and an external charging plug disposed on individual ones of the charging containers, one or both of the external charging port and the external charging plug being configured to couple with one or both of a location standard charging port and a location standard plug corresponding to the location of the charging station; and one or more physical computer processors configured by machine-readable instructions to:

obtain charge information and battery health information for individual batteries within the fleet of aircraft batteries from the charging containers located at individuals ones of the multiple airports, wherein the charge information includes charge statuses of the individual batteries and the battery health information characterizes the degradation of the individual batteries over time;

determine, based on the battery health information, predictions of one or more batteries to be re-allocated, to receive maintenance, or to be re-allocated and to receive maintenance;

generate a battery management plan including the one or more predictions recommending one or more batteries to be re-allocated, to receive maintenance, or to be re-allocated and to receive maintenance; and effectuate presentation of the battery management plan via a graphical user interface.

2. The system of claim 1, wherein the predictions of the one or more batteries to be re-allocated, to receive maintenance, or to be re-allocated and to receive maintenance are determined via machine learning.

3. The system of claim 1, wherein the individual batteries comprise battery packs having multiple batteries.

4. The system of claim 1, wherein the one or more processors are further configured by machine readable instructions to:

obtain flight schedule information for multiple airports located in separate and distinct locations, the flight schedule information including flight times, flight departure location information, flight arrival location information, flight durations, and flight power requirements;

obtain utility information characterizing one or both of the cost and availability of power at the individual ones of the multiple airports;

determine allocations of individual batteries within the fleet of aircraft batteries to individual flights on individual aircraft;

generate a distribution plan including one or more of the allocations of the individual batteries within the fleet of aircraft batteries to individual flights on individual aircraft; and effectuate presentation of the distribution plan via a graphical user interface.

5. The system of claim 4, further comprising a jack for exchanging individual batteries within the fleet of aircraft batteries between one or both of individual aircraft and the charging containers according to the distribution plan.

6. The system of claim 4, wherein the utility information includes green energy potential information.

7. The system of claim 1, wherein the one or more processors are further configured by machine-readable instructions to:

obtain flight schedule information for multiple airports located in separate and distinct locations, the flight schedule information including flight times, flight departure location information, flight arrival location information, flight durations, and flight power requirements;

determine, based on the charge information, the battery health information, and the flight schedule information, a future maintenance schedule for one or more individual batteries within the fleet of aircraft batteries.

8. The system of claim 1, wherein the one or more processors are further configured by machine-readable instructions to:

determine based on the battery health information for a segment of batteries, leasing information characterizing leasing costs for the segment of batteries.

9. The system of claim 1, the battery health information is obtained by pulling battery health data from the individual batteries while charging.

10. A method for maintaining a fleet of aircraft batteries located at multiple airports, the method being performed by one or more processors configured by machine-readable instructions, the method comprising:

obtaining charge information and battery health information for individual batteries within the fleet of aircraft batteries, wherein the charge information is obtained from charging containers located at individuals ones of the multiple airports, and wherein the charging containers contain multiple charging stations having universal fleet charging ports that correspond to one or both of universal fleet charging plugs on the individual batteries and multiple charging stations with universal fleet charging plugs that correspond to universal fleet charging ports on the individual batteries, and wherein the charge information includes charge statuses of the individual batteries and the battery health information characterizes the degradation of the individual batteries over time;

determining, based on the battery health information, predictions of one or more batteries to be re-allocated, to receive maintenance, or to be re-allocated and to receive maintenance;

generating a battery management plan including the one or more predictions recommending one or more batteries to be re-allocated, to receive maintenance, or to be re-allocated and to receive maintenance; and effectuating presentation of the battery management plan via a graphical user interface.

11. The method of claim 10, wherein the predictions of the one or more batteries to be re-allocated, to receive maintenance, or to be re-allocated and to receive maintenance are determined via machine learning.

12. The method of claim 10, wherein the individual batteries comprise battery packs having multiple batteries.

13. The method of claim 10, further comprising:

obtaining flight schedule information for multiple airports located in separate and distinct locations, the flight schedule information including flight times, flight departure location information, flight arrival location information, flight durations, and flight power requirements;

obtaining utility information characterizing one or both of the cost and availability of power at the individual ones of the multiple airports;

determining allocations of individual batteries within the fleet of aircraft batteries to individual flights on individual aircraft;

generating a distribution plan including one or more of the allocations of the individual batteries within the fleet of aircraft batteries to individual flights on individual aircraft; and effectuating presentation of the distribution plan via a graphical user interface.

14. The method of claim 13, further comprising:

exchanging individual batteries within the fleet of aircraft batteries between one or both of individual aircraft and the charging containers according to the distribution plan.

15. The method of claim 13, wherein the utility information includes green energy potential information.

16. The method of claim 10, further comprising:

obtaining flight schedule information for multiple airports located in separate and distinct locations, the flight schedule information including flight times, flight departure location information, flight arrival location information, flight durations, and flight power requirements;

determining, based on the charge information, the battery health information, and the flight schedule information, a future maintenance schedule for one or more individual batteries within the fleet of aircraft batteries.

17. The method of claim 10, further comprising:

determining based on the battery health information for a segment of batteries, leasing information characterizing leasing costs for the segment of batteries.

18. The method of claim 10, wherein the battery health information is obtained by pulling battery health data from the individual batteries while charging.

* * * * *